Nov. 18, 1958   W. H. SILVER ET AL   2,860,564
SAFETY TRIP DEVICE
Filed July 19, 1956   2 Sheets-Sheet 1

WALTER H. SILVER
ROBERT E. COX          INVENTORS
ANTHONY S. TRAPKUS
BY
ATTORNEYS

Nov. 18, 1958 W. H. SILVER ET AL 2,860,564
SAFETY TRIP DEVICE
Filed July 19, 1956 2 Sheets-Sheet 2
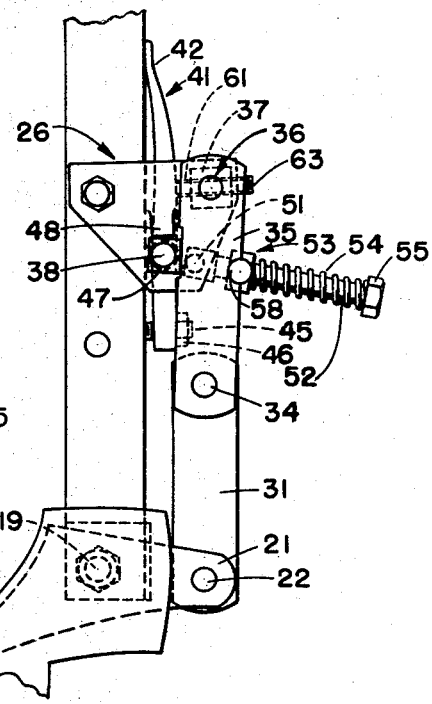
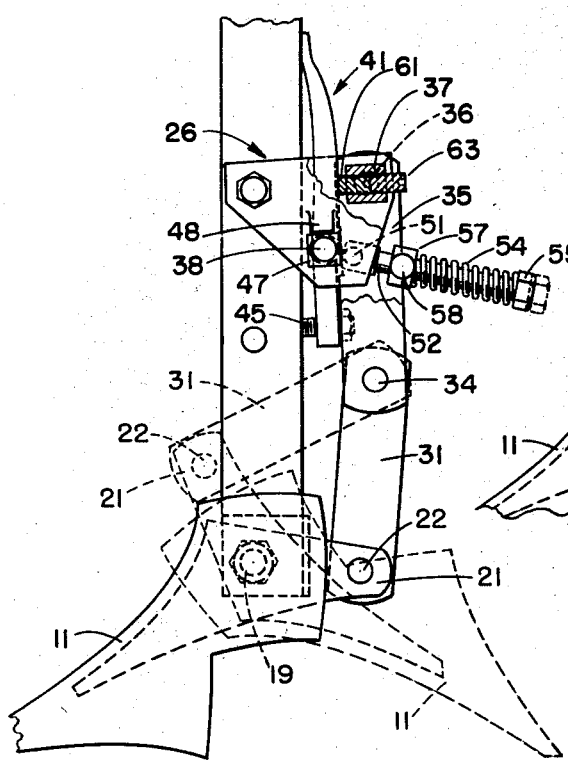
WALTER H. SILVER
ROBERT E. COX
ANTHONY S. TRAPKUS
INVENTORS United States Patent Office 2,860,564
Patented Nov. 18, 1958

2,860,564
SAFETY TRIP DEVICE

Walter H. Silver, Robert E. Cox, and Anthony S. Trapkus, Moline, Ill., assignors, by mesne assignments, to Deere & Company, a corporation of Delaware Application July 19, 1956, Serial No. 598,896

10 Claims. (Cl. 97—47.88)

The present invention relates generally to agricultural implements and more particularly to ground working implements, such as plows, listers, bedders and other implements having ground working tools.

The object and general nature of the present invention is the provision of a safety trip device that is accurately responsive to overloads of the magnitude for which the device is designed and/or adjusted, certain and positive in action, and adapted to be easily and quickly restored to operating condition after tripping in response to an overload, such as the ground working tool means encountering an obstacle, such as a stone, stump or the like.

These and other objects and advantages of the present invention will be apparent to those skilled in the art after a consideration of the following detailed description, taken in conjunction with the accompanying drawings, in which:

Fig. 2 is an enlarged side view of the safety trip mechanism.

Fig. 3 is a view similar to Fig. 2, showing the positions the parts take after the occurrence of and in response to an overload but before the tool has been moved to its completely tripped position, the latter position being indicated in dotted lines.

Figure 1:
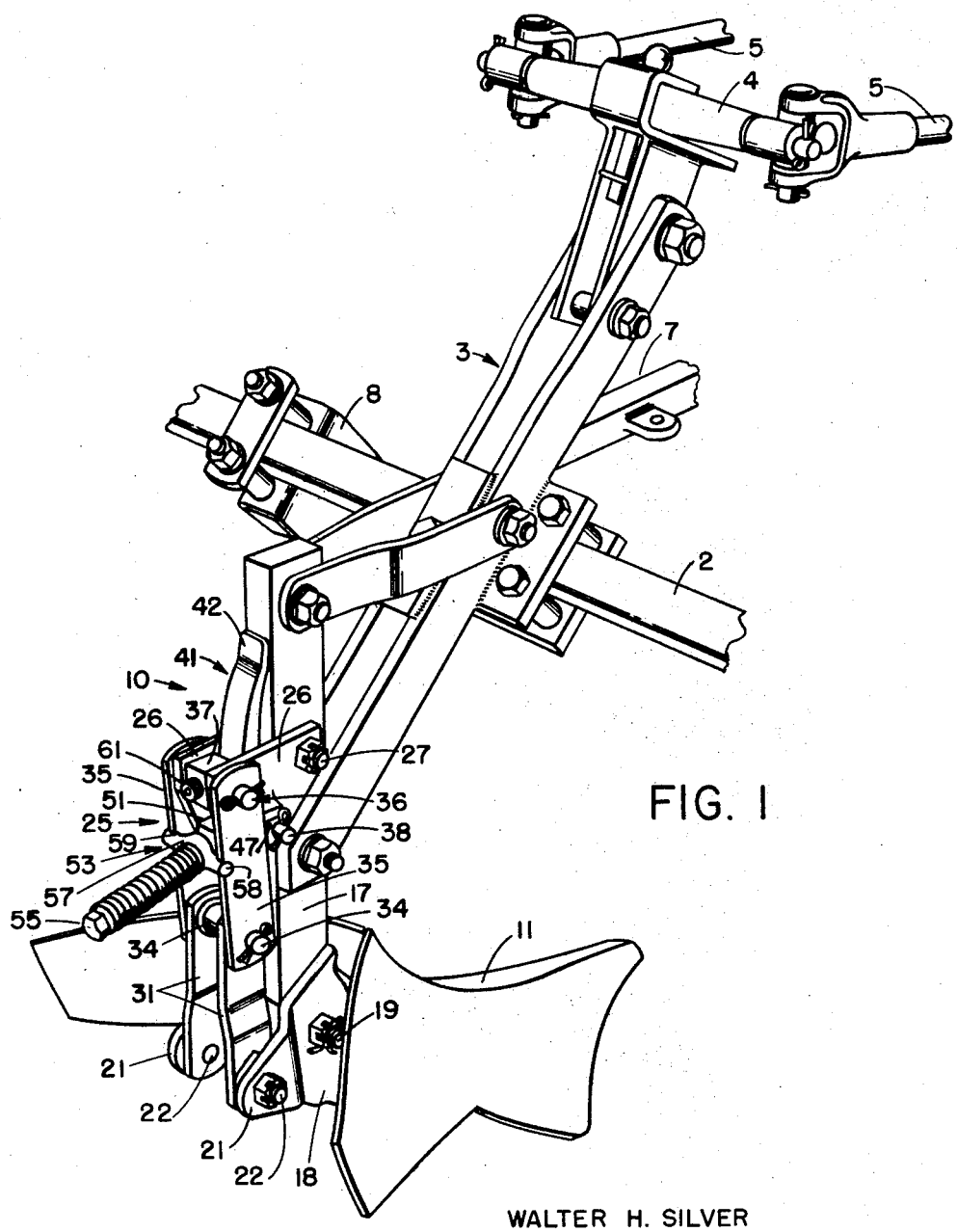
Fig. 1 is a fragmentary perspective view of the rear portion of a tractor-mounted middlebreaker or bedder.

Referring first to Fig. 1, the safety trip mechanism, with which the present invention is particularly concerned, is shown as incorporating in an implement that is mounted on a transverse toolbar 2 and includes attaching structure 3 connected to the toolbar 2 and at its upper portion to a short crossbar 4 by which a pair of upper links 5, normally forming a part of a propelling and supporting tractor, are connected. The toolbar 2 is connected to the two lower draft links 7 of the tractor by suitable bracket means 8. Only one bracket means and one link 7 are shown in Fig. 1. The safety trip mechanism is indicated at 10 and serves to connect a ground working tool, such as a lister or bedder bottom 11, to the toolbar 2. The latter is adapted to be raised and lowered by the power lift mechanism of the tractor in that usual way. Since the tractor and associated lifting means are conventional, these parts have been omitted from the drawings.

The trip mechanism 10 of the present invention is primarily provided so that if, in operation, the bottom 11 should engage or come into contact with an obstruction, such as a stump, stone or the like, the bottom 11 will not be damaged, nor will any associated parts be bent or broken, but instead, the bottom 11 will swing back so that the obstruction may be safely passed over.

The ground working tool 11 is pivotally connected to the lower end of a vertical standard 17 by means of a pair of plates 18, which are pivotally conected with the lower end of the standard through pivot means 19, and associated frog structure connecting the bottom 11 to the plates 18. As best shown in Fig. 1, the latter have rear offset portions 21 that are pivotally connected, as at 22, with a generally vertically disposed toggle linkage 25 that at its upper end is connected with the upper portion of the standard 17 through anchoring means in the form of a pair of anchoring plates 26 swingably mounted on the pivot member 27 carried by the upper end portion of the standard 17.

The toggle linkage 25 includes lower link means in the form of a pair of lower toggle links 31 pivotally connected at their lower ends with the pivot means 22. The upper ends of the toggle links 31 are pivotally connected, as by a pair of pivot pins 34, with the lower ends of a pair of toggle links 35 that constitute upper toggle link means that is pivotally connected at its upper end to the rear portions of the anchoring plates 26. To this end, the plates 26 carry a trunnion-like member 36 the central portion of which is formed as a block 37 having a transverse threaded aperture formed therein, and to which reference will be made below.

The anchoring plates 26 extend generally downwardly and laterally outwardly from the standard 17 and, at their lower portions, are apertured to receive a cross pin 38 that extends not only laterally through the anchoring plates 26 but also through a leaf spring member 41, the upper end 42 of which bears against the rear edge of the standard 17 and the lower portion of which is apertured to receive the pin 38. The lower end of the leaf spring member 41 is screw threaded to receive an adjusting set screw 45 which at its inner end bears against the standard 17 and at its outer end, at the rear side of the spring member 41, receives a lock nut 46. Each end of the transverse pin 38 receives a plain, or untapped, nut member 47, each nut member being located so as to receive the associated upper toggle link member 35, serving as stop means for the latter. Each nut member 47 is arranged to have limited rotation on the pin 38, such motion being limited by a tab 48 struck outwardly from the associated anchoring member plate 26.

The anchoring plates 26, just rearwardly of the apertures receiving the pin 38, are apertured to receive a second pin 51 that extends from one anchoring plate 26 to the outer but lies within the upper toggle links 35. The pin 51 receives the forward end of a rod member 52 that extends rearwardly and receives a member 53 against which a coil spring 54, encircling the rod member 52, bears. A nut or other suitable abutment 55 is carried at the rear end of the rod member 52 and receives the reaction of the spring 54. The member 53 is in the nature of a trunnion having a central section 57 that is apertured to slidably receive the rod member 52, and outwardly extending parts 58 that are rockably disposed in notches 59 formed in the rear edges of the associated toggle links 35. The spring 54 is designed, and if necessary the abutment member 55 is adjusted, to provide a relatively light pressure acting between the toggle links 35 and the pivoted anchoring plates 26 to hold the upper toggle links 35 against the stop members 47. This defines the straightened or force-transmitting position of the toggle linkage 25, in which position the pivot 34, interconnecting the two toggle link means, lies slightly over-center in the forward direction by an amount that is sufficient to insure that the forces acting when the bottom 11 engages an obstruction are transmitted substantially directly upwardly to the pivoted anchoring means 26, which forces tend to rock the latter member upwardly, or in a counterclockwise direction as viewed in Fig. 2.

The leaf spring member 41 constitutes a relatively strong resilient means that opposes the above mentioned upward movement of the anchoring members 26 when overload conditions are encountered. Specifically, the leaf spring member 41 is connected with the anchoring plates 26 at two points, one being where the transverse pin 38 passes through the plates 26 and through the adjacent portion of the spring member 41. The other point is defined by an adjusting set screw member 61 that is carried in a transverse opening formed in the block member 37 and which engages the outer face of the spring member 41 at a point above or spaced from the pin 38. To insure that the adjusting member 61 will be retained in the adjustment desired, the opening in the block 37 carries a second screw threaded member 63 that when tightened down against the member 61, acts as a lock nut or jam nut and prevents any change in the adjustment of the member 61 relative to the anchoring plates 26.

The operation of the safety trip device of the present invention is substantially as follows.

If the bottom 11 should encounter a stump or other obstruction, the impact and draft forces are transmitted directly to the anchoring means 26 through the toggle linkage 25 in its straightened or force-transmitting position, as shown in Fig. 2. The spring member 41, acting as a resilient cantilever, resists the upward swinging of the anchoring member 26 with a force that is sufficient to hold the bottom 11 to its work under all normal conditions but which yields, and permits the anchoring member 26 to swing in a counterclockwise direction as viewed in Fig. 2, when an obstruction or other immovable object is encountered. The resulting rocking of the anchoring members 26 is accompanied by a rearward or outward movement of the stop members 47 that, as described above, bear against or receive the upper toggle link members 35. A relatively small amount of swinging movement of the anchoring members 26 results in the stop members 47 shifting the toggle links rearwardly past their straight-line or dead-center position, and as soon as the links 21 and 35 move rearwardly past their straight-line position, they can no longer transmit normal loads upwardly to the spring 41. Instead, the toggle links break rearwardly, which permits the pivot 22 to swing relatively freely upwardly and forwardly, allowing the bottom 11 to move into an inoperative or tripped position, as shown in dotted lines in Fig. 3. The spring means 54 yields to permit this tripping action, for the spring 54 is relatively light and functions primarily to retain the toggle links in their forwardly overcenter or force-transmitting position during normal operation. The spring 54 does not materially resist the tripping of the bottom 11 after it encounters a relatively immovable obstruction. In one form of the present invention, the spring 54 is designed to exert a force of about 185 lbs. while the spring 41 is capable of resisting a force of about 4,000 lbs. applied to the point of the bottom 11, which means that the spring 41 is able normally without appreciable yielding to resist an upward force of about two or three times this magnitude transmitted upwardly through the toggle links in their force-transmitting position.

By virtue of the fact that when, as under overload conditions, the transmitted forces become excessive, and such excessive force is utilized directly to swing the toggle linkage into its released position, the responsiveness of the safety trip device of the present invention and the accuracy of its release are not materially effected by changes in the functional characteristics of the various pivots and the like, as may take place during periods of long operation where no obstructions are encountered.

Adjusting the members 61 and 63 provides for varying the magnitude of the overload at which the device responds, such adjustment being accompanied, if necessary, by a supplementary adjustment of the member 45. However, the primary function of the latter member is to adjust the stop members 47 so as to control the degree of overcenter positioning of the toggle links in their straightened or force-transmitting position. In one form of the invention, the toggle links are normally held in a position of about $\frac{1}{16}$ of an inch inwardly or forwardly of a theoretically exact straightened aligned position, which position is normally maintained by the relatively light spring 54. The force exerted by the spring 54, and the amount of overcenter disposition of the toggle linkage must be sufficient to maintain the toggle links in their force-transmitting position under all normal conditions, which may, for example, include operating in relatively hard ground in which the implement may be subjected to considerable vibration.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desired to secure by Letters Patent is:

1. In a ground working implement, a support, a ground working tool means pivoted thereto and swingable in one direction relative to said support under overload conditions, a pair of toggle links pivotally interconnected at their adjacent ends, means pivotally connecting the other end of one of said toggle links to said tool means at a point spaced from the point of pivotal connection of said tool means with said support, a toggle anchoring member pivoted to said support and pivotally receiving the other end of the other of said toggle links, load-resisting leaf spring means fixed non-rotatably to said anchoring member and reacting at one end against said support, and means carried by said anchoring member and acting against said toggle links to release them when an overload on said tool means acts to rock said anchoring member against the resisting force of said spring means.

2. In a ground working implement, a standard, a ground working tool pivoted to said standard, an anchoring member pivoted to said standard in spaced relation from said tool, a toggle linkage pivotally connected with said tool and member, resilient means acting against said anchoring member to resist pivoting thereof, toggle stop means on said member, a second spring means connected between said member and said toggle linkage to hold the latter against said stop means, and means on said member to trip said toggle linkage when said member pivots, as under overload conditions.

3. In a ground working implement, a support, a ground working tool means pivoted thereto and swingable in one direction relative to said support under overload conditions, a pair of toggle links pivotally interconnected at their adjacent ends, means pivotally connecting the other end of one of said toggle links to said tool means at a point spaced from the point of pivotal connection of said tool means with said support, a lever pivoted to said support at a point adjacent the other end of the other of said toggle links, means pivotally connecting said other end of said other toggle link to said lever, whereby any pivoting of said tool means in said one direction relative to said support is transmitted by said toggle links when held in their substantially straightened position to said lever, resilient means connected to act between said support and said lever to resist movement of the latter, and means on said lever to shift said toggle links into a released position.

4. In a ground working implement, a support, a ground working tool means pivoted thereto and swingable in one direction relative to said support under overload conditions, a pair of toggle links pivotally interconnected at their adjacent ends, means pivotally connecting the other end of one of said toggle links to said tool means at a point spaced from the point of pivotal connection of said tool means with said support, a lever pivoted to said support at a point adjacent the other end of the other of said toggle links, means pivotally connecting said other end of said other toggle link to said lever, whereby any pivoting of said tool means in said one direction relative to said support is transmitted by said toggle links when held in their substantially straightened position to said lever, relatively light spring means acting to hold the associated toggle link against a part of said lever so as to thereby hold said toggle links in their substantially straightened position, relatively strong spring means connected with said lever and with said support so as to react against the latter and resist pivoting of said lever under forces from said tool means transmitted to said lever through said substantially straightened toggle links, and means on said lever engageable with said toggle links to swing the latter out of their substantially straightened position so as to release said tool means for movement without further reaction against said relatively strong spring means.

5. The invention set forth in claim 4, further characterized by said relatively light spring means acting through said toggle links in their angled position to hold said tool means in its tripped position.

6. In a ground working implement, a standard, a ground working tool pivoted to said standard, an anchoring member pivoted to said standard in spaced relation from said tool, a toggle linkage pivotally connected with said tool and member, leaf spring means extending generally along said standard and bearing adjacent one end portion against the standard, means non-rotatably connecting the other end portion of said spring means with said anchoring member, a part on the latter serving as stop means engageable by said toggle linkage to define the force-transmitting position thereof, and means carried by said member and acting yieldably against said toggle linkage to hold the latter against stop means.

7. The invention set forth in claim 6, further characterized by said part on the anchoring member including a member passing through said spring means and said anchoring member.

8. The invention set forth in claim 6, further characterized by said anchoring member comprising a pair of plates pivoted to said standard and disposed on opposite sides of said leaf spring means, said part on the anchoring member including a member passing through said spring means and said plates.

9. The invention set forth in claim 8, further characterized by said toggle linkage including link means in the form of a pair of links disposed at the outer sides of said plates, said toggle links reacting against said part in the force-transmitting position of said toggle linkage.

10. A safety trip device comprising a support, a first part shiftable relative thereto, a second part shiftable relative to said support, resilient means connected to act between said support and said second part to resist movement of the latter in one direction, toggle link means normally disposed in an overcenter position and connected between said parts whereby an overload acting against said first part tends to shift said second part in said one direction against the action of said resilient means, and means actuated by movement of said first part when said resilient means yields to shift said toggle link means out of said overcenter position and thus releasing the connection between said parts.

References Cited in the file of this patent

UNITED STATES PATENTS

| | | |
|---|---|---|
| 327,358 | Traphagen | Sept. 29, 1885 |
| 941,933 | Logan et al. | Nov. 30, 1909 |
| 2,565,668 | Simpson | Aug. 28, 1951 |